United States Patent [19]

Utsumi

[11] Patent Number: 5,287,483
[45] Date of Patent: Feb. 15, 1994

[54] PREFETCHED OPERAND STORING SYSTEM FOR AN INFORMATION PROCESSOR

[75] Inventor: Tohru Utsumi, Yokohama, Japan

[73] Assignee: Kabushiki Kaisha Toshiba, Kawasaki, Japan

[21] Appl. No.: 914,037

[22] Filed: Jul. 14, 1992

Related U.S. Application Data

[63] Continuation of Ser. No. 376,232, Jul. 6, 1989, abandoned.

[30] Foreign Application Priority Data

Jul. 6, 1988 [JP] Japan .................. 63-166855

[51] Int. Cl.⁵ .............................................. G06F 13/00
[52] U.S. Cl. ............................... 393/425; 364/DIG. 1
[58] Field of Search ... 364/200 MS File, 900 MS File; 395/400 MS, 425 MS

[56] References Cited

U.S. PATENT DOCUMENTS

| | | | |
|---|---|---|---|
| 4,293,908 | 10/1981 | Bradley et al. | 364/200 |
| 4,349,874 | 9/1982 | Woods et al. | 395/250 |
| 4,429,368 | 1/1984 | Kurii | 364/200 |
| 4,466,055 | 9/1984 | Kinoshita et al. | 364/200 |
| 4,488,227 | 12/1984 | Miu et al. | 364/200 |
| 4,527,237 | 7/1985 | Frieder et al. | 395/200 |
| 4,573,118 | 2/1986 | Damouny et al. | 364/200 |
| 4,672,537 | 6/1987 | Katzman et al. | 364/200 |
| 4,722,047 | 1/1988 | Chan et al. | 395/400 |
| 4,729,093 | 3/1988 | Mothersole et al. | 395/375 |
| 4,763,253 | 8/1988 | Bluhm et al. | 395/375 |
| 5,062,036 | 10/1991 | Barrow et al. | 395/375 |

*Primary Examiner*—Joseph L. Dixon
*Assistant Examiner*—Reba I. Elmore
*Attorney, Agent, or Firm*—Foley & Lardner

[57] ABSTRACT

An information processor for prefetching memory operands stored in an external storage device comprises a first storage for storing addresses used for accessing the external storage device; a selector for selecting either an address in the first storage or data read out of the external storage device; a second storage for storing the contents selected by the selector as well as data to be written in the external storage device; a third storage for storing an address read out of the first or second storage; and a controller. When an error occurs in reading data from the external storage device, the controller controls the selector to select the address in the first storage as an error address. The error address is once stored in the second storage and then transferred to and stored in the third storage. When an error occurs in writing data into the external storage device, the controller controls the third storage such that the address in the first storage is directly transferred to and stored in the third storage. The error address stored in the third storage is used for an interrupt process for coping with the error.

6 Claims, 2 Drawing Sheets

PREFETCHED OPERAND STORING SYSTEM FOR AN INFORMATION PROCESSOR

This application is a continuation of application Ser. No. 07/376,232, filed Jul. 6, 1989, now abandoned.

BACKGROUND OF THE INVENTION

1. Field of the Invention

The present invention relates to an information processor that saves a plurality of addresses of errors occurring during bus cycles for prefetching memory operands.

2. Description of the Prior Art

Known information processors prefetch memory operands according to prefetched instructions to improve processing speed.

FIG. 1 is a view showing an essential part of a conventional information processor performing such a prefetching operation of memory operands.

In the information processor of FIG. 1, a memory operand is read out of an external storage device (not shown). A memory address corresponding to the memory operand to be read is stored in one register in an address register group (AP) according to a microinstruction. The memory address stored in the register group 1 is transferred to a memory address register (MAR) 5 according to an AP select signal given by a control logic 3, and the transferred memory address is latched in the memory address register (MAR) 5 according to an address latch signal given by the control logic 3. Then, the memory address is given to the external storage device.

According to the memory address, operand data is read out of the external storage device. After that, a bus cycle completion signal is externally given to the control logic 3. In synchronism with the bus cycle completion signal, the control logic 3 outputs a DP select signal to designate one register in a data storage register group 7 to store the read operand data in the designated register. In this way, the memory operand data is read out.

When the information processor accesses the external storage device in, for instance, the read operation, a bus cycle error may sometimes occur.

For example, when a parity error checking circuit in the external storage device detects an error or when a part of the external storage device where no access is allowed is accessed, a bus cycle error signal is generated to indicate the occurrence of bus cycle error. The bus cycle error is handled with an interrupt process. To activate the interrupt process, the information processor saves an address at which the bus cycle error occurred and delivers the address as interrupt information to an interrupt handler. Therefore, the address at which the bus cycle error occurred is given to a stack and stored therein.

In the arrangement of FIG. 1, if a bus cycle error occurs during the read of a memory operand, a bus cycle error signal is externally given to the control logic 3. Then, the control logic 3 provides an error address register (EAR) select signal synchronized with the bus cycle error signal to an error address register (EAR) group 9. Accordingly, the address of the bus cycle error stored in the memory address register (MAR) 5 and caused is given to and stored in one register in the error address register (EAR) group 9 that has been designated with the EAR select signal. Namely, the address stored in the memory address register (MAR) 5 is copied as an error address and stored in one register in the error address register group 9.

Meanwhile, the control logic 3 outputs an interrupt signal to activate an interrupt processing microprogram. According to this microprogram, the copied error address is read out of the error address register group 9 and pushed to a stack (not shown) via an internal bus 11.

The information processor that prefetches operand data as mentioned in the above does not always use the prefetched operand data. Therefore, the control logic 3 does not output an interrupt signal until the read operand data is actually used. In other words, at the time of prefetch, the control logic 3 does not output an interrupt signal even if a bus cycle error occurs in connection with the prefetch. Only when the data is needed, the interrupt signal is outputted to cope with the bus cycle error. Due to this, the number of error addresses supposed to be held in the error address register group 9 are equal to the number of prefetching operations.

The error address register group 9 of the information processor of FIG. 1 stores, therefore, addresses in equal number as those stored in the address register group 1. Namely, the error address register group 9 shall comprise registers of the same number as the number of registers contained in the address register group 1. Due to this, as the number of addresses to be stored in the address register group 1 increases, the scale of the error address register group 9 increases.

SUMMARY OF THE INVENTION

An object of the present invention is to provide an information processor that can save a plurality of error addresses whenever bus cycle errors occur, without increasing the scale of the information processor.

In order to accomplish the object, an information processor of the present invention for prefetching memory operands stored in an external storage device comprises first storage device for storing and holding addresses used for accessing the external storage device; selection device for selecting either an address outputted from the first storage device to read the external storage device or data read out of the external storage device; second storage device for storing and holding the contents selected by the selection device as well as data to be written in the external storage device; third storage device for storing and holding an address read out of the second storage device or an address read out of the first storage device such that the address stored in the third storage device will be read out in executing an interrupt process; and control device. When an error occurs at the time of reading data out of the external storage device, the control device controls the selection device to select an address to be outputted from the first storage device. When an error occurs at the time of writing data into the external storage device, the control device controls the third storage device such that the third storage device will store and hold an address to be outputted from the first storage device. If data read from the second storage device is an address, the control device controls the third storage device to store and hold the address in the third storage device.

With this arrangement, if an error occurs during the read operation of the external storage device, an address with which the external storage device has been accessed is set as an error address. The error address is once stored and held in the second storage device. The second storage device is usually provided for use in reading the external storage device and to store and hold a plurality of data that are inputted to or read from the external storage device. The error address is transferred to the third storage device for exclusively storing the error address. With this error address as error information, an interrupt process is executed to cope with the error.

These and other objects, features and advantages of the present invention will be more apparent from the following detailed description of preferred embodiments in conjunction with the accompanying drawings.

DETAILED DESCRIPTION OF THE EMBODIMENTS

Figure 1:
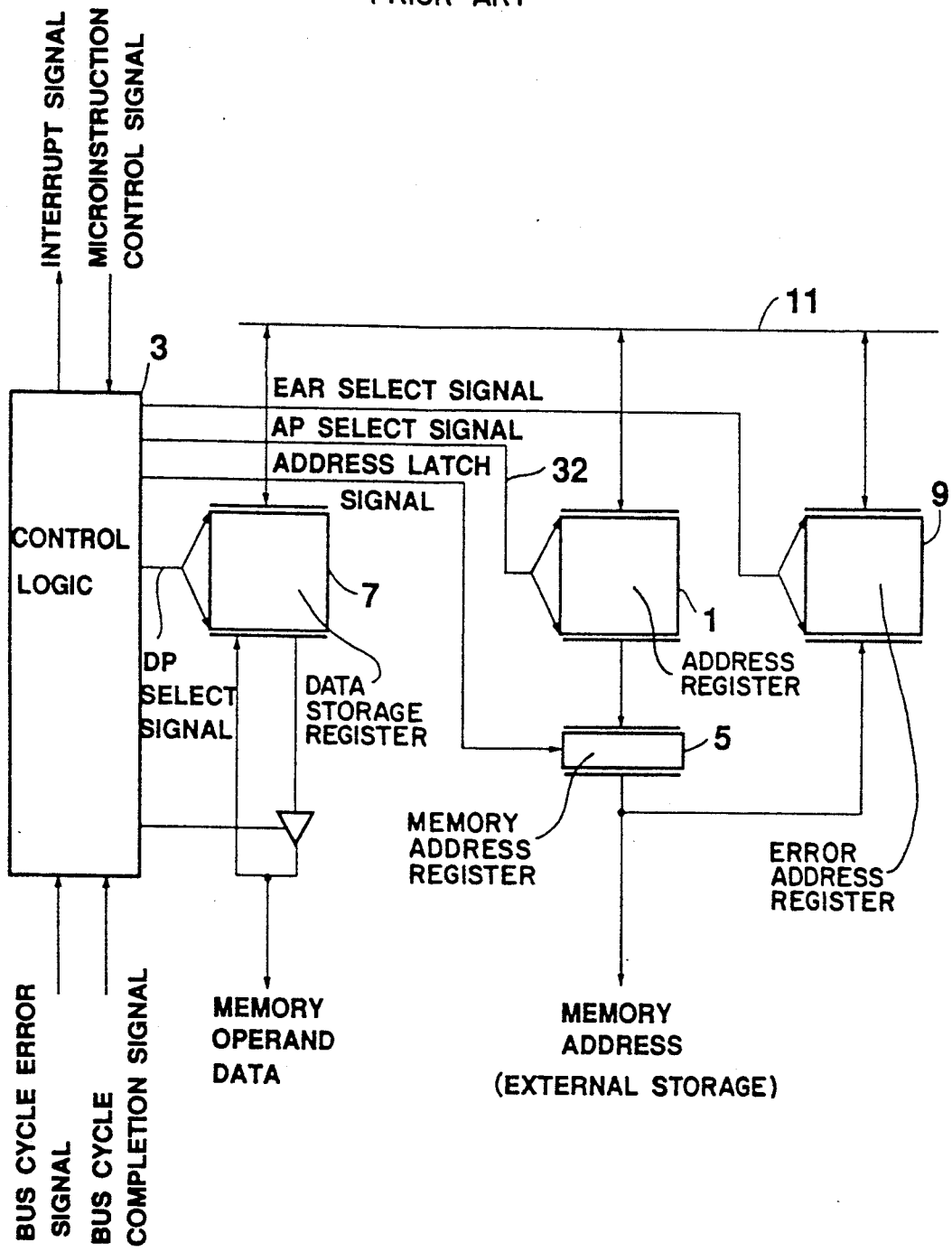
FIG. 1 is a block diagram showing a conventional information processor.
Figure 2:
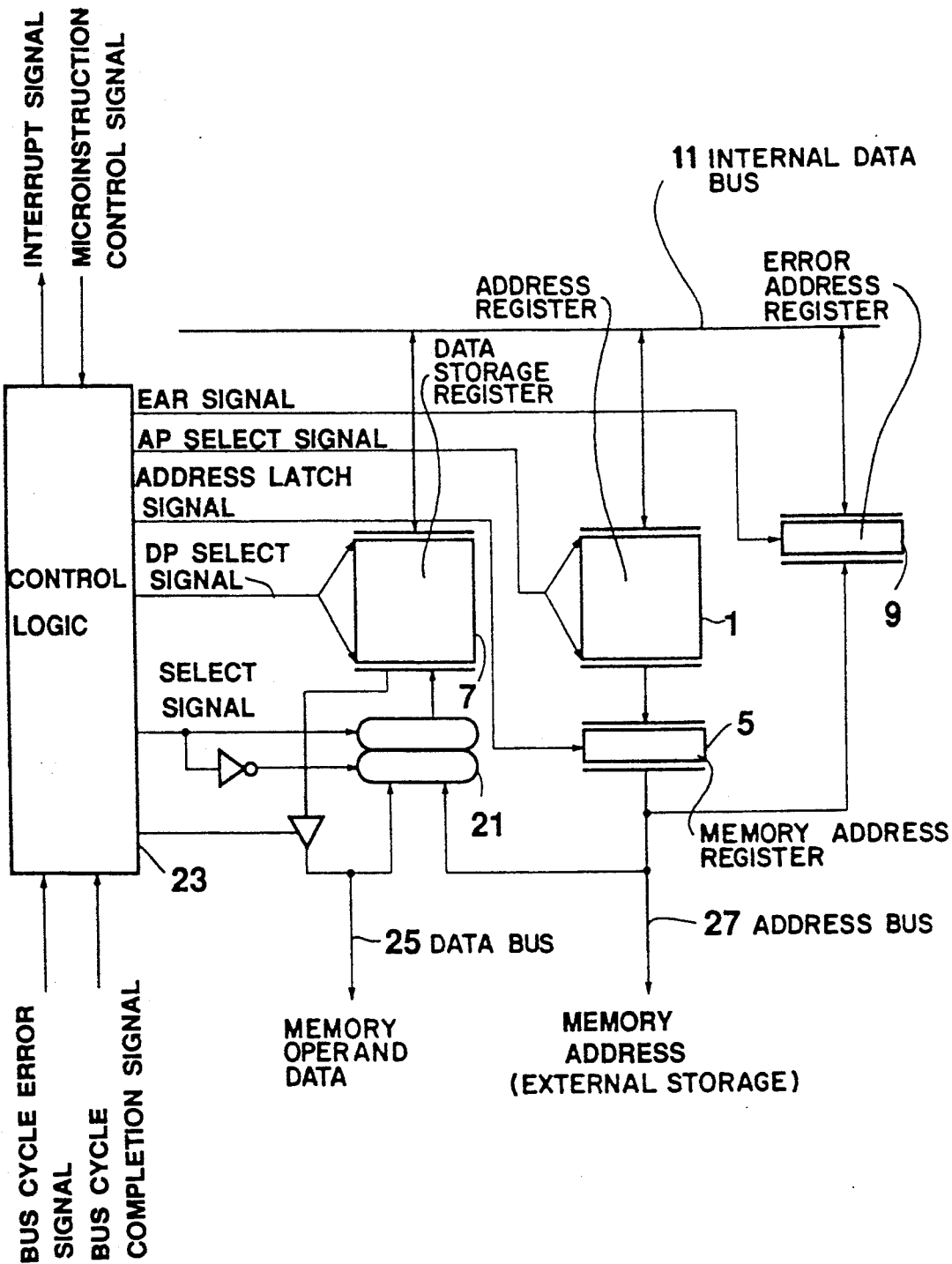
FIG. 2 is a block diagram showing an information processor according to an embodiment of the invention.

FIG. 2 is a view showing an essential part of an information processor according to an embodiment of the invention. This information processor is controlled by a microprogram for prefetching operand data. In FIG. 2, the information processor accesses an external storage device (not shown). In FIG. 2, parts represented with the same reference marks as those of FIG. 1 achieve the same functions and, therefore, their explanation will be omitted.

Similar to the information processor of FIG. 1, the information processor of FIG. 2 comprises an address register group (AP) 1, a memory address register (MAR) 5, a data register group (DP) 7 and an error address register (EAR) 9. In addition, the information processor of FIG. 2 comprises a selector 21 and a control logic 23.

The selector 21 selects either an address stored in the memory address register (MAR) 5 or operand data read out of the external storage device (not shown) via a data bus 25. This selecting operation is carried out according to a selection signal given by the control logic 23. The selected address or operand data is given to and stored in the data register group 7.

The control logic 23 controls the address register group 1, memory address register 5, data register group 7, error address register 9 and selector 21 according to signals given by a microinstruction control portion (not shown) and by an external circuit (not shown) that outputs signals related to bus cycles.

The control logic 23 receives a microinstruction control signal from the microinstruction control portion and provides an AP select signal to the address register group 1. The AP select signal selects and designates one register in the address register group 1 to store therein a read address or a write address existing on an internal bus 11. The read or write address is used to access the external storage device.

Also the control logic 23 provides an address latch signal to the memory address register 5. According to the address latch signal, the address stored in the address register group 1 is transferred to the memory address register (MAR) 5 and then given to the external storage device via an address bus 27.

In synchronism with a bus cycle completion signal externally given to the control logic 23, the control logic 23 gives a DP select signal to the data register group 7. In addition, the control logic 23 provides a selection signal to the selector 21 to select operand data read out of the external storage device. However, if a bus cycle error signal is given to the control logic 23 together with the bus cycle completion signal, the control logic 23 provides a selection signal to the selector 21 to select, as an error address, the address stored in the memory address register (MAR) 5.

Here, one bit information is recorded at any time in one register in the control logic 23. This one bit information indicates whether the information stored in the data register group 7 is operand data or an error address.

If the error address is read from the data register group 7 to the internal bus 11, the control logic 23 outputs an interrupt signal to the microinstruction control portion to request for an interrupt process, At the same time, the control logic 23 gives an error address latch signal (EAR) to the error address register 9 so that the error address on the internal bus 11 may be saved in the error address register 9. When the external storage device is in a writing mode, the error address latch signal will be a signal for fetching the address held in the memory address register (MAR) 5 and saving the same in the error address register 9.

Operation of the embodiment will be described.

Firstly, the case of a bus cycle error occurring during the read operation of the external storage device will be explained.

When a microinstruction control signal is given by the microinstruction control portion to the control logic 23, the control logic 23 provides an AP select signal to the address register group 1. Then, a read address on the internal bus 11 is stored in one register of the address register group 1 designated with the AP select signal.

The control logic 23 gives an address latch signal to the memory address register (MAR) 5. Then, the read address stored in the address register group 1 is transferred to the memory address register (MAR) 5 and held therein. The memory address register (MAR) 5 outputs the read address to the external storage device via the address bus 27 to start a read cycle for reading operand data from the external storage device.

When the read cycle is completed, a bus cycle completion signal 5 is given to the control logic 23. The control logic 23 gives a selection signal to the selector 21 to select the operand data read out of the external storage device. Further, in synchronism with the bus cycle completion signal, the control logic 23 provides a DP select signal to the data register group 7 to designate a register for storing the read operand data. Then, the operand data read from the external storage device is given to and stored in the designated register of the data register group 7 via the data bus 25 and selector 21.

If a bus cycle error occurs during the read operation of the external storage device, a bus cycle error signal is given to the control logic 23 together with the bus cycle completion signal. Then, the control logic 23 gives a selection signal to the selector 21 to select, as an error address, the address stored in the memory address register (MAR) 5. In addition, the control logic 23 provides a DP select signal to the data register group 7 to designate a register for storing the error address. As a result, the error address stored in the memory address register (MAR) 5 is selected by the selector 21 and given to and saved in the register of the data register group 7 designated with the DP select signal.

The data stored in the register of the data register group 7 is read onto the internal bus 11 according to a microinstruction. If the read data is the error address, the control logic 23 outputs an interrupt signal to the microinstruction control portion to request for an interrupt process.

In addition, the control logic 23 provides an error address latch signal (EAR) to the error address register 9 so that the error address on the internal bus 11 may be saved in the error address register 9. The saved error address is read onto the internal bus 11 according to an interrupt processing microprogram activated with the interrupt signal, and the error address is pushed in a stack.

Next, the case of a bus cycle error occurring during the write operation of the external storage device will be explained.

A write address is externally given to the internal bus 11. According to the execution of a microinstruction, the control logic 23 issues an AP select signal to designate one register in the address register group 1. The write address on the internal bus 11 is stored in the designated one register. Similarly, the control logic 23 issues a DP select signal to designate one register in the data register group 7 so that write data may be stored in the designated one register. At the same time, the control logic 23 provides an address latch signal to the memory address register (MAR) 5 so that the write address may be transferred from the address register group 1 to the memory address register (MAR) 5 and stored therein. Then, the write address is given to the external storage device via the address bus 27 to start a write cycle for writing the write data into the external storage device.

If a bus cycle error occurs during the write cycle, a bus cycle error signal is given together with a bus cycle completion signal to the control logic 23. Then, the control logic 23 provides an error address latch signal (EAR) to the error address register 9 so that the write address held in the memory address register 5 is copied as an error address and saved in the error address register 9. At the same time, the control logic 23 outputs an interrupt signal to the microinstruction control portion. After the output of the interrupt signal, the error address stored in the error address register 9 is pushed to the stack via the internal bus 11, similarly to the case of the read cycle error.

In this way, if a bus cycle error occurs during read operation of the external storage device, an error address related to the bus cycle error is once stored in the data register group 7 and then transferred to and stored in the error address register 9. On the other hand, if a bus cycle error occurs during write operation of the external storage device, an error address is directly stored in the error address register 9.

Even if there are a plurality of error addresses to occur in prefetching operands, only one register for exclusively storing one error address is sufficient to be provided. Therefore, compared with the conventional technique, the error address register of the invention may be made compact. In addition, a microprogram for error interrupt process is required to push an error address to the stack from the error address register which is a single register. Therefore, unlike the conventional technique in which a microprogram for error interrupt process deals with a plurality of error address registers, the microprogram of the invention may be simplified.

As described in the above, according to the information processor of the invention, an error address corresponding to an error occurred in reading an external storage device is once stored in storage means that is usually provided for reading the external storage device and holding a plurality of data. After that, the error address is transferred to storage means for exclusively storing the error address to carry out an error interrupt process. Therefore, a plurality of error addresses can be saved without increasing the scale of the information processor.

Various modifications will become possible for those skilled in the art after receiving the teachings of the present disclosure without departing from the scope thereof.

What is claimed is:

1. A prefetched operand storing system for an information processor, comprising:
   (a) a first register for storing a plurality of addresses of operands, said first register being provided with a memory address register for holding an address transmitted from said first register and used for fetching data corresponding to the address;
   (b) a second register for successively storing a plurality of operands to be prefetched in accordance with said addresses stored in said first register;
   (c) a data bus for transferring said operands;
   (d) a selector connected to said second register, said memory address register and a data bus in order to selectively transfer said address held in said memory address register or an operand fetched on said data bus and corresponding to said address held in said memory address register;
   (e) a control circuit connected to said first and second registers and said selector, said control circuit receiving a bus cycle error signal for indicating whether data provided on said data bus has been read out with a bus cycle error signal, said control circuit controlling said selector such that when said bus cycle error signal is not received, said operand fetched on said data bus and corresponding to said address held in said emory address register is input to said second register and when said bus cycle error is received, said address held in said memory address register being input to a location of said second register, as an error address, where said operand fetched on said data bus and corresponding to said address held in said memory address register is otherwise to be stored.

2. The system as claimed in claim 1, further comprising an external memory and wherein said first register is provided with a single register for holding one of said addresses until said data corresponding to said one of said addresses is completely read out of the external memory, said one of said addresses held in the single register being supplied to the external memory and to said selector.

3. The system as claimed in claim 1, wherein said second register is provided with a single register for holding information indicating whether said data stored in said second register is said operand or said error address, such information being recorded in the single register of said second register whenever said data is written into said second register.

4. The system of claim 1 further comprising an error address register connected to said second register, such that when an instruction having an operand corresponding to said error address is executed, said error address is transferred from said second register to said error address register.

5. The system of claim 4 wherein when said error address is accessed during execution of the instruction having said operand corresponding to said error address, said control circuit provides an interrupt signal to said information processor.

6. An operand prefetch system for prefetching a plurality of operands in order to enable an information processor to successively execute instructions using operands which have been prefetched, said system comprising:

an address register group for collecting a plurality of addresses of operands for use in a subsequent operand fetch;

a data register group for accumulating a plurality of operands prefetched for a subsequent execution of a succession of said instructions in accordance with said addresses collected in said address register group; and control logic connected with said address and data register groups for supplying control signals to said address and data register groups in order to collect said addresses in said address register group and collect prefetch operands into said data register group, wherein, if a bus cycle error occurs during the prefetch of an operand corresponding to one of said addresses collected in said address register group, said one of said address is stored in that location of said data register group where the operand corresponding to said one of said addresses collected in said address register group is otherwise to be stored.

* * * * *